United States Patent [19]
Seel et al.

[11] Patent Number: 5,507,475
[45] Date of Patent: Apr. 16, 1996

[54] ERECTOR FOR HOLDING A LEAF-FLAP IN VARIOUS OPENING SETTINGS

[75] Inventors: Holger Seel; Kurt Schaible, both of Aidlingen, Germany

[73] Assignee: Mercedes-Benz AG, Germany

[21] Appl. No.: 295,387

[22] Filed: Aug. 25, 1994

[30] Foreign Application Priority Data

Aug. 25, 1993 [DE] Germany ............ 43 28 571.6

[51] Int. Cl.$^6$ .................................................. F16F 5/00
[52] U.S. Cl. .................. 267/64.12; 267/126; 188/322.15
[58] Field of Search .................. 292/144; 188/322.15, 188/322.11, 282, 284, 285, 317; 267/64.11, 64.12, 113, 124, 126, 195, 217

[56] References Cited

U.S. PATENT DOCUMENTS

| 4,732,408 | 3/1988 | Öhlin .................................. 188/322.15 |
| 4,973,077 | 11/1990 | Kuwayama et al. ............... 188/322.15 |

FOREIGN PATENT DOCUMENTS

| 2355210 | 1/1978 | France ................................. 188/282 |
| 1459182 | 1/1973 | Germany . |
| 2927621 | 3/1981 | Germany . |
| 4239172 | 12/1993 | Germany . |
| 1746903 | 7/1992 | U.S.S.R. ........................... 188/322.15 |

*Primary Examiner*—David M. Mitchell
*Assistant Examiner*—Chris Schwartz
*Attorney, Agent, or Firm*—Evenson, McKeown, Edwards & Lenahan

[57] ABSTRACT

An erector holds a leaf-flap in various opening settings relative to its frame, in particular for holding a motor-car hood. The erector has a continuously length-variable dynamic unit, which comprises, supported against the leaf-flap and frame, a hollow cylinder and a piston which is slidably guided in the hollow cylinder. The hollow-cylinder space is divided by the piston moved via a piston rod, into a two pressure-medium chambers which are overflow-connected, with a flow regulator being interposed therebetween. A control valve is disposed in one of two overflow ducts of the flow-regulator so that the assigned overflow duct, when the control valve is closed, is flow-blocked in both directions. The control valve is constantly flow-connected via a control duct to one of the pressure-medium chambers, and is acted upon by the pressure-medium column flowing through the control duct, so as to be transferred against a return force into a pass-through setting in which it is maintained up to a pressure level of the pressure-medium which is significantly lower than the control pressure of the control valve.

5 Claims, 1 Drawing Sheet

5,507,475

ERECTOR FOR HOLDING A LEAF-FLAP IN VARIOUS OPENING SETTINGS

BACKGROUND AND SUMMARY OF THE INVENTION

The present invention relates to an erector for holding a leaf-flap in various opening settings relative to its frame, in particular for holding a motor-car hood or bonnet.

A known erector is described in DE 42 39 172 C1, in which the erector is drawn apart, by attachment of its ends to the frame or to the leaf-flap, as the leaf-flap is opened, and is collapsed again as the leaf-flap is closed. Due to the purely fluidic flow regulation of the embodiment exhibiting two non-return valves and a step valve, there is no occurrence of either disturbing operating noises or measurable wear. The flow regulator is also already distinguished by a relatively simple configuration having a small number of movable parts.

An object of the present invention is to provide a substantially improved erector which has a technically simplified flow regulator in terms of a reduction in movable parts.

The foregoing object has been achieved in accordance with the present invention by providing an erector comprising a continuously length-variable dynamic unit operatively supported with respect to the leaf-flap and the frame and having a hollow cylinder and a piston movable via a piston rod and slidably guided in the hollow cylinder to divide an interior space of the hollow cylinder into two pressure-medium chambers which are overflow-connected with each other. A flow regulator is operatively interposed between the two chambers and has a direction-reversible through-flow depending upon an advancement direction of the piston. The flow regulator comprises a flow-duct system having two valves pushed open by a pressure-medium column and respectively operatively arranged at an associated overflow duct such that the overflow ducts are capable of being shut off against through-flow in one direction by the valve associated therewith one of the two valves being a control valve configured a step valve and to flow-block the associated overflow duct in both directions when the control valve is closed. The flow regulator has a push-open position constituting a pass-through setting into which it is moved under pressurization by the pressure-medium column flowing through an associated control duct, against a return force in which it is maintained up to a pressure level of the pressure-medium which is significantly lower than the control pressure of the control valve which comprises a differential piston axially displaceable against a spring load, whereby control pressure of the pressure- medium acts upon a first piston surface of the differential piston and whereby the pressure-medium which is in force in the pass-through setting acts upon a second piston surface of the differential piston which is larger than the first piston surface.

In the case of motor-car hoods or other swivel-up vehicle parts, on one hand, it is generally sufficient if a locking effect is achieved in one directional sense only. Minimal push-open forces can herein be provided for the one-way valve disposed in the overflow duct, so that restraint is not detectable. In the event of opposite-directed overflow, on the other hand, the control valve, which is determinant for the arresting locking forces, is pushed open. Excessive push-open forces are also in this case unnecessary, owing to the pressure-equalization via the equalization duct.

Preferably, the erector exhibits a dynamic unit acting as a relief spring, which can be, for example, a pneumatic spring, this being particularly advantageous for weight reasons.

A particularly compact configuration of the dynamic unit herein becomes possible if the pressure-medium in the pressure-medium chambers is kept by way of a spring store under an elevated working pressure.

Advantageously, the flow regulator can be integrated in a known manner into the piston of the dynamic unit, with a path-optimized duct system being provided.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
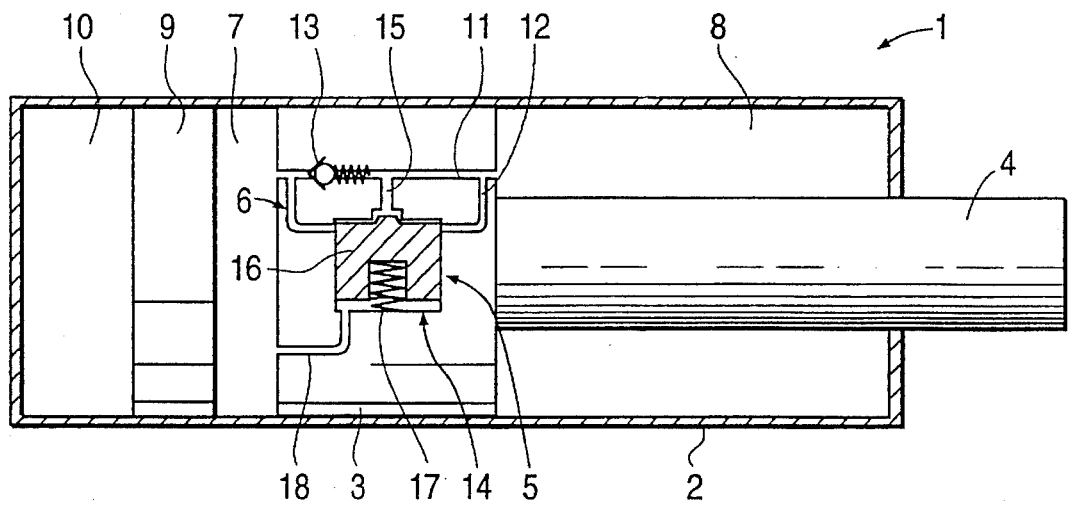
FIG. 1 is a longitudinal sectional view through a dynamic unit of an erector according to the present invention when the step valve is closed.

Conventional erectors are configured in the style of a linkage, for holding hoods, hinged flaps, covers or even doors of motor vehicles, which are attached by one end to the leaf-flap and by their other end to the frame, whereby they are drawn apart or collapsed, in continuous adjustment, in dependence on the opening or closing motion. The erectors thus hold the leaf-flap automatically in any intermediate setting. Because such conventional erectors are sufficiently well known in terms of basic construction, it is not necessary to illustrate and describe herein their overall construction.

More precisely, the present invention is directed to the illustrated dynamic unit designated generally by the numeral 1, which first allows the erector to be continuously varied in length and which is in the illustrated embodiment configured as a pneumatic spring. The dynamic unit 1 comprises a hollow cylinder 2, in which a piston 3 is coaxially slidably guided, forming a circumferential seal to the cylinder wall, a piston rod 4, which is guided out of the hollow cylinder 2, forming a circumferential seal, and is connected in an axially fixed manner to the piston 3, and a flow regulator 5, integrated into the piston 3 and having an associated flow duct system 6.

Because the piston 3 is fixedly connected only on one side to the piston rod 4, it divides the hollow cylinder space into two pressure-medium chambers 7 and 8 of different hollow cross-section. The pressure-medium chamber 7 exhibits the full piston cross-section, and the pressure-medium chamber 8 exhibits an annular cross-section which is reduced by the cross-section of the piston rod. The gaseous, and hence resiliently compressible, pressure-medium filling the pressure-medium chambers 7, 8 is kept under an elevated working pressure by the force of a pretensioning device indicated by an overhung auxiliary piston 9, which is slidably guided, thereby forming a circumferential seal, in the pressure-medium chamber 7 and thereupon separates a pressure space 10 containing the spring-store medium from the remaining working space of the pressure-medium chamber 7. As the spring-store medium, an axially compressible steel spring or, alternatively, a gas cushion can herein be provided. In place of the displaceable auxiliary piston 9, especially where a gas cushion is used as the spring store medium, a flexible membrane of a known type can also be used this being characterized, in particular, by a substantially lower weight and by being able to ensure a permanently reliable sealing of the pressure space 10.

In order to enable the pressure-medium to overflow from the pressure-medium chamber 7 into the pressure-medium chamber 8 and vice versa when the piston 3 is displaced, the flow duct system 6 of the flow regulator 5 comprises two overflow ducts 11 and 12. A non-return valve 13 is disposed in duct 11 and a step valve 14 is disposed in duct 12. Because the non-return valve 13 is configured, as far as possible, to develop no restraining forces whatsoever when the piston 3 slides into the hollow cylinder 2, the non-return valve 13 can already be fully pushed open by a small pressure increase in the pressure-medium chamber 7 and hence barely resists the overflow of the pressure-medium from the pressure-medium chamber 7 into the pressure-medium chamber 8. Given appropriate sizing or coordination, the non-return valve 13 can be fully dispensed with, because the valve 13, when the piston 3 is slid back in connection with a pressure increase in the pressure-medium chamber 8 resulting already from the dynamic gas forces, is forced onto its valve seat so as to form a reliable seal and thus prevents the pressure-medium from overflowing through the overflow duct 11 into the pressure-medium chamber 7. Any overflow of the pressure-medium from the pressure-medium chamber 8 into the pressure-medium chamber 7 can thus only continue to be effected via that part of the duct system 6 containing the step valve 14.

This portion of the flow duct system 6 providing for overflow comprises a control duct 15, which is constantly flow-connected to the pressure-medium chamber 8 and emerges or leads into the pre-chamber of the step valve 14. This pre-chamber is located centrally at the end of a cylindrical cavity of the step valve 14. In this cavity of the step valve 14 a cylindrical differential piston 16 is slidably guided, forming a seal which runs around the peripheral side which, under the spring-loading of a helical compression spring 17, is held in an upper dead-center position. The helical compression spring 17 is herein disposed in a space-saving manner in a depression which is recessed centrally out of the piston skirt.

In order to guarantee a sealing of the pre-chamber against the main chamber of the step valve 14 in the upper dead-center position of the differential piston 16, a conical elevation projects from the otherwise flat crown of the differential piston 16, opposite the pre-chamber. The peripheral surface of the conical elevation bears in a sealing manner against the opposite annular seat of the pre-chamber. Opposite sides of the peripheral wall in the upper end region of the main chamber containing the piston 16 are provided with flow openings which merge or lead into the clear cross-section of the overflow duct 12.

In order to simplify the flow duct system 6, the end regions of the overflow duct 12 and the end region of the control duct 15 merge or lead into the assigned end regions of the overflow duct 11, whereby the overflow duct 12 and control duct 15 branch off from the overflow duct 12 and by-pass the non-return valve 13. Furthermore, the flow duct system 6 comprises an equalization duct 18, via which the cylinder space of the step valve 14, on the side opposite the pre-chamber, is constantly flow-connected to the pressure-medium chamber 7. On the bottom side of the differential piston 16, the pressure obtaining also in the pressure-medium chamber 7 is thus always in force, which pressure opposes the pushing-open of the step valve 14. The spring-loading of the differential piston 16 is consequently able to be limited to a very small spring force.

The above described dynamic-unit 1 works as follows. Whenever the motor-car bonnet or hood is folded shut, the distances between the attachment points of the erector with the leaf-flap and frame are reduced, whereby the dynamic unit 1 is collapsed into the setting shown in FIG. 1. As a result of the pressure increase in the pressure-medium contained in the pressure-medium chamber 7, the non-return valve 13 is herein pushed open and allows the pressure-medium to overflow, with little resistance, through the overflow duct 11 into the pressure-medium chamber 8. The overflow duct 12 is, however, shut off against overflow in both directions by the differential piston 16 which is held in its upper dead-center position.

During the slide-in operation of the piston 3, the working volume of the hollow cylinder 2 is increasingly diminished, since the piston rod 4 holding the piston 3 enters increasingly into the hollow cylinder 2. This cause a continuous pressure increase in the pressure-medium over the slide-in path of the piston rod 4. Despite the weak helical compression spring 17 the differential piston 16 remains in its upper dead-center position, because the bottom side of the differential piston 16 is subjected by the equalization duct 18 to the respective system pressure. The same system pressure acting upon the small surface of the differential piston 16 therefore remains ineffective to move the piston 16. When system pressure in the pressure-medium chambers 7 and 8 equalizes as the piston 3 is slid on, the non-return valve 13 closes, as a result of its spring-loading.

Moreover, the piston 3 is subjected to load in its slide-out direction under the spring force of the more heavily compressed pressure-medium, since the pressure medium in the pressure-medium chamber 7 acts with equal system pressure upon the entire piston-crown surface and in the pressure-medium chamber 8 only upon that piston ring surface of the piston 3 which remains between the piston rod 4 and hollow cylinder 2. This slide-out load also, however, remains ineffective under equalized system pressure, since the setting of the piston 3 in the hollow cylinder 2 is arrested by the step valve 14.

Figure 2:
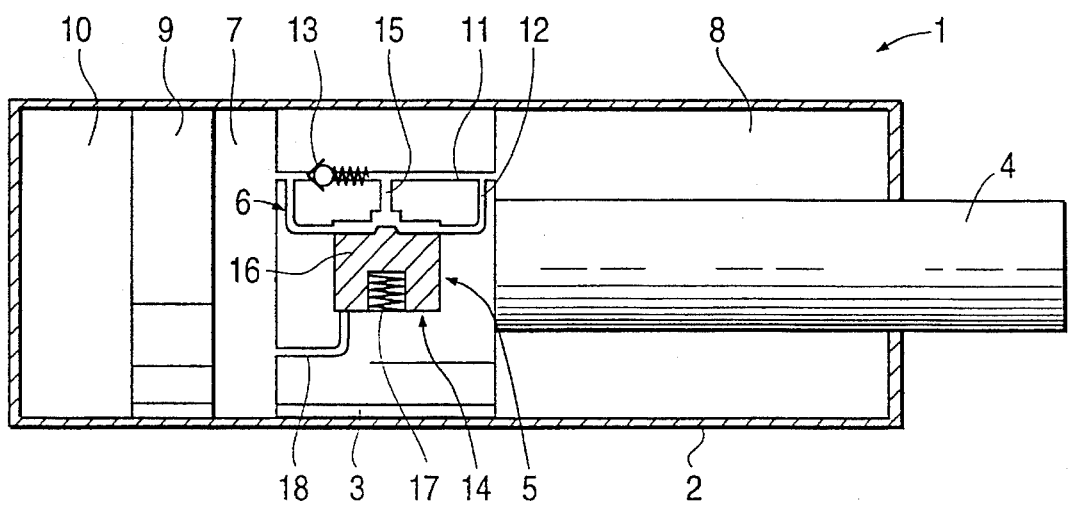
FIG. 2 is the same longitudinal sectional view according to FIG. 1 but when the step valve is open.

Only when the piston 3 is subjected to additional slide-out load by external forces in terms of a lengthening of the dynamic unit 1, e.g. by slight raising of the motor-car bonnet, is a pressure increase produced in the pressure-medium in the pressure-medium chamber 8. The pressure-medium column in the overflow duct 11, shares in this pressure increase and forces the ball of the non-return valve 13 firmly onto its valve seat, whereby the overflow duct 11 is reliably shut off in the direction of the pressure-medium chamber 7. At the same time, this pressure increase is sufficient to push open the step valve 14, against the return force of the compression spring 17 and of the pressure-medium column acting upon the bottom side of the differential piston 16, into a pass-through setting shown in FIG. 2. The thereby obtained instantaneous restraint of the draw-out motion is relatively slight, since the pressure increase in the pressure-medium chamber 8 is accompanied by a corresponding fall in pressure in the pressure-medium chamber 7. Hence, the equalization pressure on the bottom side of the differential piston 16 also reverts correspondingly to lower values. Furthermore, the dynamics of the pressure-medium column in the control duct 15 have an advantageous effect upon the push-open operation.

After the pressure-medium column in the control duct 15 has pushed open the differential piston 16 by pressurization of its small piston surface, the shut-off of the overflow duct 12 by the differential piston 16 is also lifted. As a result, the pressure-medium transversely flows through the hollow chamber of the step valve 14 with the entire crown surface of the differential piston 16 being acted upon by the pressure-medium. The continuing displacement of the piston 3 in the slide-out direction can now be smoothly effected, because the control pressure pushing open the step valve 14 does not need to be maintained. Because of the thus abandoned arresting of the piston 3 by the step valve 14, the slide-out loading of the piston 3 is also simultaneously relinquished. As the pressure-medium expands, the piston 3 is thus automatically further displaced and herein maintains an overpressure in the pressure-medium chamber 8, which overpressure prevents the step valve 14 from closing.

Only when a continuing slide-out of the piston rod 4 is prevented by external forces, which can be brought about in each partly slid-out intermediate setting, does a full pressure- equalization again take place between the pressure-medium chambers 7 and 8. The differential piston 16 is then forced back, under its spring-loading, into its upper dead-center position, so that the piston 3 is again arrested in the hollow cylinder 2 by way of the step valve 14.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An erector for holding a leaf-flap in opening settings relative to a frame, comprising a continuously length-variable dynamic unit operatively supported with respect to the leaf-flap and the frame and having a hollow cylinder and a piston movable via a piston rod and slidably guided in the hollow cylinder to divide an interior space of the hollow cylinder into two pressure-medium chambers which are overflow-connected with each other, a flow regulator operatively interposed between the two chambers and configured to have a direction-reversible, through-flow depending upon an advancement direction of the piston, the flow regulator comprising a flow-duct system having two valves configured to be pushed open by a pressure-medium column and respectively operatively arranged at an associated overflow duct such that the respective overflow duct is capable of being shut off against through-flow in one direction by the valve associated therewith, one of the two valves being a control valve configured as a step valve to flow-block, when closed, the associated overflow duct in both directions, and the flow regulator being configured to be moved under pressurization by the pressure-medium column flowing through an associated control duct, against a return force in which it is maintained up to a pressure level of the pressure-medium which is significantly lower than a control pressure of the step, valve which comprises a differential piston axially displaceable against a spring load, whereby control pressure of the pressure- medium acts upon a first piston surface of the differential piston and whereby the pressure-medium which is in force in the pass-through setting acts upon a second piston surface of the differential piston, wherein the step valve is arranged to be constantly flow-connected via the associated control duct to one of the pressure-medium chambers, the flow-duct system further comprising an equalization duct, via which a cylinder space of the step valve, on a side thereof opposite the control duct, is constantly flow-connected to the other of the pressure-medium chambers.

2. The erector according to claim 1, wherein the dynamic unit is configured to be biased into a slid-out supporting setting and arrested exclusively by the step valve, with a cylinder space of the step valve being flow-connected via the equalization duct to the full-piston side of the dynamic unit.

3. The erector according to claim 2, wherein the dynamic unit is a pneumatic spring.

4. The erector according to claim 2, wherein a spring maintains the pressure- medium under elevated work pressure in the pressure-medium chambers of the dynamic unit.

5. The erector according to claim 1, wherein the flow regulator is integrated into the piston of the dynamic unit, the overflow ducts being merged together at end regions thereof and interconnected via the control duct.

\* \* \* \* \*